No. 635,491. Patented Oct. 24, 1899.
T. J. LEE.
COTTON CHOPPING ATTACHMENT FOR PLOWS.
(Application filed Jan. 11, 1899.)
(No Model.)
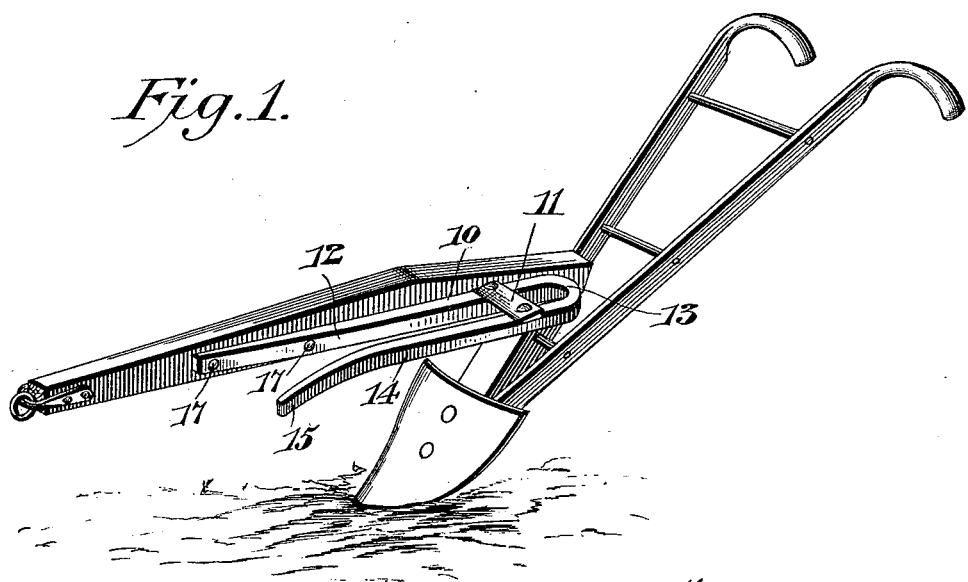
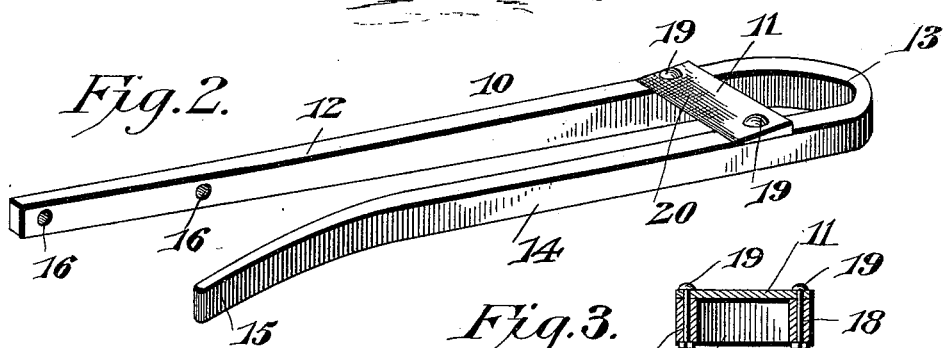
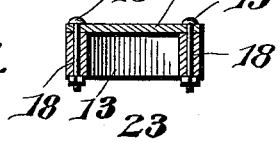
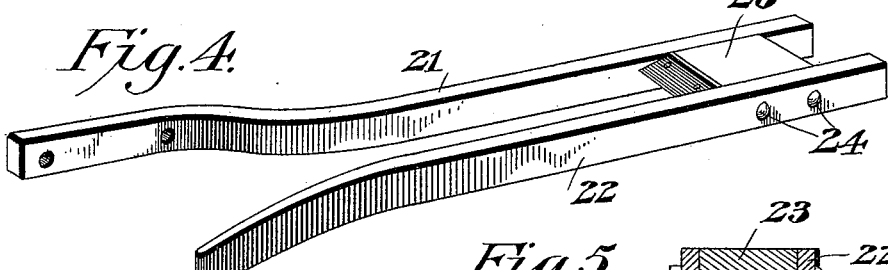
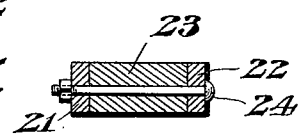
Witnesses
Jas. K. McCuthran
H. F. Beruhof
T. J. Lee Inventor
By his Attorneys,
C. A. Snow & Co.

UNITED STATES PATENT OFFICE.

THOMAS J. LEE, OF CARY, GEORGIA.

COTTON-CHOPPING ATTACHMENT FOR PLOWS.

SPECIFICATION forming part of Letters Patent No. 635,491, dated October 24, 1899.

Application filed January 11, 1899. Serial No. 701,866. (No model.)

*To all whom it may concern:*

Be it known that I, THOMAS J. LEE, a citizen of the United States, residing at Cary, in the county of Pulaski and State of Georgia, have invented a new and useful Cotton-Chopping Attachment for Plows, of which the following is a specification.

My invention relates to a cotton-chopping attachment for plows, and the primary object in view is to provide a simple device which may be readily applied to an ordinary plow or cultivator for the purpose of cutting the stalks or heads of cotton-plants, so that the limbs and tops thereof may be turned under by the implement.

A further object of the invention is to provide a cheap and efficient construction embracing a means for deflecting or guiding the cotton-stalks to the cutter and which also provides for the secure attachment of the cutter-blade in a manner to enable the latter to be readily removed for the convenient sharpening of the blade.

With these ends in view the invention consists in the novel construction and arrangement of parts, which will be hereinafter fully described and claimed.

To enable others to understand the invention, I have illustrated the same in the accompanying drawings, forming a part of this specification, and in which—

Figure 1 is a perspective view of an ordinary plow with my cotton-chopping attachment applied thereto. Fig. 2 is a detail perspective view of the attachment removed from the implement. Fig. 3 is a transverse section through the gatherer and the knife or blade. Fig. 4 is a detail perspective view of another embodiment of the attachment, and Fig. 5 is a transverse section through the device shown by Fig. 4.

Like numerals of reference denote like and corresponding parts in each of the several figures of the drawings.

The cutter attachment of my invention consists of a yoke-shaped gatherer 10 and a blade or knife 11. In the preferred embodiment of the gatherer shown by Figs. 2 and 3 of the drawings, it is cast in a single piece of metal or bent from a metallic bar or rod to provide the fastening-arm 12, the guide-arm 14, and the curved heel 13. The two arms of the gatherer are arranged in the same horizontal plane and substantially parallel to each other, and said arms are joined together by the curved heel 13. The arm 14 is bent or deflected laterally, as at 15, with respect to the fastening-arm 12 of the gatherer, and the front end of this gatherer is thereby formed with a widened throat or mouth by which the stalks of a row of cotton-plants may readily enter the space between the arms of the gatherer. The fastening-arm 12 is provided near its free front end with transverse bolt-holes 16, through which are adapted to pass the bolts 17, that serve to fasten the gatherer to the beam of a plow or cultivator. The arms of the gatherer are provided with vertical bolt-holes 18, which lie in advance of the curved heel 13, and the blade or knife 11 is fitted transversely on this gatherer for openings near the ends of the blade to register with the bolt-holes 18. The bolts 19 pass through the coincident holes in the blade and gatherer, and thereby firmly clamp the blade in position in front of the heel 13. The blade is provided with a cutting edge 20, which spans the space between the arms of the gatherer, and this blade is adapted when the implement is in service to shear off the heads and stalks of a row of cotton-plants, which severed portions of the plants are free to drop between the rows and to be turned under by the implement.

In the embodiment of the invention, as illustrated by Figs. 4 and 5, the gatherer is composed of separate arms 21 and 22, and a cutter-block 23 is interposed between the rear ends of the arms for the purpose of receiving the transverse bolts 24, by which the two arms and the cutter-block may be bound or united firmly together. The arm 21 is perforated near its front end for the reception of bolts, by which the gatherer may be secured firmly to one side of the plow beam or stock, while the other arm 22 has its free end deflected to form a guide adapted to direct the stalks of cotton-plants into the gatherer. The block 23 has its front end beveled to a cutting edge, which spans the space between the arms and enables said block to cut off the stalks and heads of the plants.

In applying my attachment to an ordinary plow or cultivator the front end of the arm 12 is fitted laterally against one side of the beam and the bolts 17 are passed through the arm of the beam to receive the nuts by which the gatherer is fastened firmly in place to assume a horizontal position on the landside of the implement. The blade or knife having been sharpened and properly adjusted to the gatherer, the attachment is ready for service. When the implement is drawn across a field, the share or shovel on the stock turns the soil in the ordinary way, and the stalks or cotton-plants are directed into the space of the yoke-shaped gatherer. The blade or knife severs the stalks, which are free to fall on the ground and to be turned under the soil by the action of the share or shovel.

My attachment is simple in construction and cheap of manufacture, and it may readily be applied by the farmer to any ordinary plow or cultivator, thus saving the farmer the expense of a separate instrument for chopping the cotton-stalks. The blade of the chopper may readily be detached for the purpose of sharpening the edge thereof, and the entire attachment may be removed at any time from the plow when the farmer desires to plow the ground or cultivate the field.

Changes may be made in the form and proportion of some of the parts, while their essential features are retained and the spirit of the invention embodied. Hence I do not desire to be limited to the precise form of all the parts as shown, reserving the right to vary therefrom.

The size and proportion of the metallic bar to form the gatherer may be varied as desired; but I prefer to make the gatherer from a bar which is rectangular—as, for example, one-half-inch thick by one and one-half inches wide—but this is optional. The blade has its cutting edge beveled throughout the length thereof in order to facilitate sharpening of the blade when it is removed from the gatherer.

Having thus described the invention, what I claim is—

1. A cotton-chopping attachment for plows consisting of a yoke-shaped gatherer having one arm thereof constructed for secure application to the implement and a removable blade or knife which spans the space between the arms of the gatherer, substantially as described.

2. The combination with a plow or cultivator, of a horizontal yoke-shaped gatherer having one of its arms united firmly to the plow, and a knife or blade secured detachably to said gatherer in rear of the open front end thereof and arranged for its cutting edge to span the space between the arms of said gatherer, substantially as described.

3. A cotton-chopping attachment for plows consisting of a gatherer provided with a guide-arm which has a deflected outer end and a blade fast with the gatherer and arranged transversely across the same in rear of the open front end thereof, substantially as described.

4. In a cotton-chopping attachment for plows, a gatherer comprising a fastening-arm provided with bolt-holes at the front end, and a guide-arm having a deflected front end and arranged in substantially parallel relation to the fastener-arm, combined with a knife-block interposed between the rear ends of the fastening and guide arms, and bolts that serve to unite the arms and the knife-block firmly together, substantially as described.

In testimony that I claim the foregoing as my own I have hereto affixed my signature in the presence of two witnesses.

THOMAS J. LEE.

Witnesses:
B. J. HOLT,
ROBT. A. NISBET.